United States Patent
Chacko et al.

(10) Patent No.: US 7,526,682 B1
(45) Date of Patent: Apr. 28, 2009

(54) EFFECTIVE DIAGNOSIS OF SOFTWARE HANGS

(75) Inventors: Joseph K. Chacko, Sheffield (GB); Shirish T. Shenvi Kuncolienkar, Bangalore (IN); Ajith Ramanath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/143,350

(22) Filed: Jun. 20, 2008

(51) Int. Cl.
*G06F 11/00* (2006.01)
(52) U.S. Cl. ...................................... 714/38
(58) Field of Classification Search .................. 714/38
See application file for complete search history.

(56) References Cited

U.S. PATENT DOCUMENTS

| | | | |
|---|---|---|---|
| 7,278,057 B2 * | 10/2007 | Betancourt et al. | 714/38 |
| 2006/0248401 A1 * | 11/2006 | Carroll et al. | 714/38 |
| 2006/0253837 A1 | 11/2006 | Hudson et al. | |

OTHER PUBLICATIONS

"DTrace", http://wikis.sun.com/display/DTrace/Introduction, 16 pages, Nov. 27, 2007.

"Java technology, IBM Style: Monitoring and problem determination," http://www.ibm.com/developerworks/java/library, 11 pages, Jun. 13, 2006.

"Omniscient Debugging," http://www.lambdacs.com/debugger, 3 pages, Feb. 18, 2007.

Krunic et al., NodeMD: Diagnosing Node-Level Faults in Remote Wireless Sensor Systems, ACM MobiSys 2007, pp. 43-56, Jun. 2007.

* cited by examiner

*Primary Examiner*—Scott Baderman
*Assistant Examiner*—Jigar Patel
(74) *Attorney, Agent, or Firm*—Oppenheimer Wolff & Donnelly LLP

(57) ABSTRACT

One aspect of the present invention involves storing the operating time offset of a thread within an area of memory of the thread, and storing a load time and a relative load time for each frame of the thread stored within an area of memory of the frame. The operating time offset tracks the amount of time the thread has actively operated, the frame load time tracks the actual time the frame was loaded, and the relative frame load time tracks the time the frame was loaded after being adjusted for the inactivity of the thread. When a thread dump is performed at a specified time, a frame age and a relative frame age can be calculated for each frame based on the time of the thread dump, the operating time offset of the thread, the load time of the frames within the thread, and the relative load time of the frames within the thread.

1 Claim, 5 Drawing Sheets

| | Age | Relative Age |
|---|---|---|
| 201 java.net.SocketInputStream.socketread0() | 500 ms | 500 ms |
| 202 java.net.SocketInputStream.read() | 0 ms | 0 ms |
| 203 java.io.BufferedInputStream.fill() | 500 ms | 0 ms |
| 204 java.io.BufferedInputStream.read1() | 10 ms | 10 ms |
| 205 java.io.BufferedInputStream.read() | 2 ms | 2 ms |
| 206 com.ibm.jndi.ldap.Connection.run() | 13 ms | 13 ms |
| 207 java.lang.Thread.run() | 75 ms | 75 ms |

200

| | Age | Relative Age |
|---|---|---|
| 211 | 60500 ms | 60500 ms |
| 212 | 0 ms | 0 ms |
| 213 | 500 ms | 0 ms |
| 214 | 10 ms | 10 ms |
| 215 | 2 ms | 2 ms |
| 216 | 13 ms | 13 ms |
| 217 | 75 ms | 75 ms |

210 — tight loop in top frame over 60 seconds

| | Age | Relative Age |
|---|---|---|
| 221 | 100 ms | 100 ms |
| 222 | 60400 ms | 60400 ms |
| 223 | 500 ms | 0 ms |
| 224 | 10 ms | 10 ms |
| 225 | 2 ms | 2 ms |
| 226 | 13 ms | 13 ms |
| 227 | 75 ms | 75 ms |

220 — loop in 2nd frame over 60 seconds

| | Age | Relative Age |
|---|---|---|
| 231 | 60500 ms | 1400 ms |
| 232 | 0 ms | 0 ms |
| 233 | 500 ms | 0 ms |
| 234 | 10 ms | 10 ms |
| 235 | 2 ms | 2 ms |
| 236 | 13 ms | 13 ms |

230 — thread was suspended for 59 seconds

Fig. 2

EFFECTIVE DIAGNOSIS OF SOFTWARE HANGS

FIELD OF THE INVENTION

The present invention generally relates to the operation of software on a computer system. The present invention more specifically relates to a method of identifying hanging threads operating within a software application on a computer system.

BACKGROUND OF THE INVENTION

During the operation of software, users may experience unresponsiveness within a software application due to the following reasons: threads caught in a classic deadlock condition; threads caught in an infinite loop; threads performing blocking I/O calls; threads waiting for an event to be posted; and threads waiting for release of locks owned by other blocking threads.

Identifying such culprit threads from among the other threads in the system can be difficult and time consuming. One existing method for diagnosis involves collecting multiple system/thread dumps at different points in time and comparing the thread states and stack traces in the dumps to identify threads which have not progressed. The threads that have not progressed in all of the dumps would be considered as potentially hung.

This method of diagnosis is manual in nature and may not be completely fool-proof. This is because as part of the normal execution of the program, a thread could be iteratively performing the same task/procedure over and over again, and hence there is a high chance that it would be seen in the same state/procedure in all the dumps. Similarly, the stack trace for a thread performing an intended blocking operation would always appear to be the same across all dumps. Hence, this method does not provide conclusive evidence that the thread is indeed the cause of any problem.

Basic tracking and profiling methods also exist to track the status of threads and how much time is spent in each method or function currently on a thread stack. Further, there are many implementations that store timing information for threads and methods called by those threads. For example, some methods use thread local data to generate and publish the timing values of methods and functions to tools. Alternatively, debuggers or the trace engines of virtual machines (such as the Java VM) are capable of recording method/function events and time information, and there are also a number of tools that use this information to provide the user with method profiling data that shows the elapsed time of methods within a thread. However, each of these techniques requires some external monitoring of the thread, and do not provide the timing information directly in the thread.

What is needed is an efficient and effective method of diagnosing thread hangs within a software application without the use of external monitoring tools and without the need to recreate the hanging condition after tools or settings have been applied.

BRIEF SUMMARY OF THE INVENTION

One aspect of the present invention includes effectively detecting hung and unresponsive threads in a multi-threaded software application. In one embodiment, the present invention allows the user to identify likely causes of software hangs and performance issues by displaying the age of each frame in the call stack. Thus, only one thread dump need be taken. The thread dump shows the current state of all threads in addition to historical timing information of each frame to identify the specific method, thread, or threads responsible for making the software unresponsive.

In one embodiment of the present invention, a "thread time offset" value is tracked within an area of memory of a thread, and contains a timestamp value updated upon the start, suspension, and resumption of the thread. This thread time offset value is correspondingly used to determine the relative time that the thread is actively running. Additionally, a "load time" value is tracked within an area of memory of each thread frame, and a "relative load time" value is tracked within an area of memory of each thread frame. The load time value is a timestamp which is recorded when each frame is loaded, and the relative load time value is a timestamp value derived when the frame is loaded from the load time for the frame minus the thread time offset value of the thread. Thus, the relative load time value indicates the relative amount of time that a frame has actively operated.

To obtain the timing values for the thread, a thread dump is performed. Based on the load time and relative load time values saved within the frame, the frame age and relative frame age of each frame may be calculated. The frame age indicates the amount of time that the frame method has been running, and the relative frame age indicates the amount of time that the frame has actively performed operations (i.e., the amount of time that the thread was not sleeping or suspended).

Finally, the frame age and the relative frame age values for each frame of the thread may be analyzed by the user to diagnose hanging frames of the thread operating within the software application. Hung or unresponsive threads will appear to the user with a large relative frame age.

BRIEF DESCRIPTION OF THE DRAWINGS

FIG. 2 illustrates example thread dumps in accordance with one embodiment of the present invention.

DETAILED DESCRIPTION OF THE INVENTION

Figure 1A:
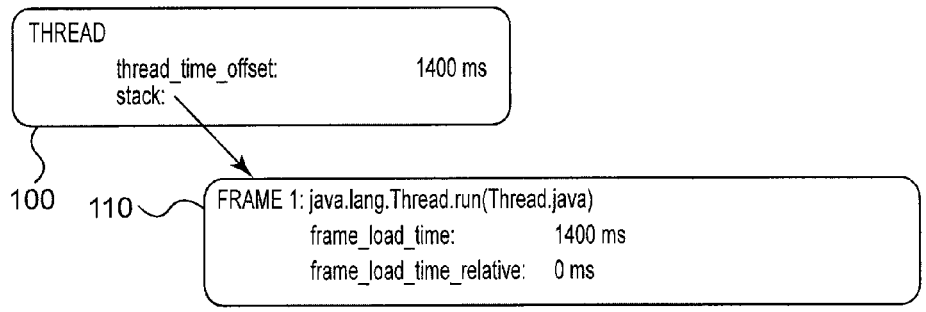
FIGS. 1A-1G illustrate an example thread and thread frames in accordance with one embodiment of the present invention.

One aspect of the present invention enables diagnosis of thread hang conditions without the use of additional software debug options. One embodiment includes the storage of timing data against methods/functions directly onto the thread of execution, by annotating the method itself with the time information. This is distinguishable from implementations that achieve the same objective by using a tracing mechanism, or by storing both the method and timing information in a separate area away from the thread of execution itself.

In one embodiment of the present invention, each thread and frame contains an area of memory for related time information. For example, one implementation of the present invention adds one piece of data per thread and two per stack frame. The data stored within each thread is a value known as the "Thread Time Offset", and the data stored within each frame are values known as "Frame Load Time" and "Relative Frame Load Time." The following generic code in C syntax demonstrates:

For each thread, one additional datum is stored:

clock_t thread_time_offset;

For each stack frame in each thread, two further data are stored:

clock_t frame_load_time;

clock_t frame_load_time_relative

As frames are loaded, their time stamps are recorded in memory. The Thread Time Offset is updated whenever the thread is suspended or resumed. This allows the relative time for the thread to be computed when the thread is running.

When a thread starts, the start time is recorded:

thread_time_offset=clock( );

When a thread is suspended, its running time is computed and stored:

thread_time_offset=clock( )−thread_time_offset;

When that thread is resumed, its effective start time is computed and stored:

thread_time_offset=clock( )−thread_time_offset;

Accordingly, the frame data for the Frame Load Time and the Relative Frame Load Time is set just once for each frame, when that frame is loaded. When a frame is loaded, the actual and the thread-relative times are stored with the frame:

frame_load_time=clock( );

frame_load_time_relative=frame_load_time−thread_time_offset;

In this way, the age of each frame is tracked within the frame. When a thread dump is taken, the actual age and relative age of each frame can be computed as follows:

For the top frame of an active—or running—thread, the actual frame age and the relative frame age can be computed:

frame_age=clock( )−frame_load_time;

frame_age_relative=clock( )−thread_time_offset−frame_load_time_relative;

For the top frame of a suspended thread, the relative frame age is computed slightly differently:

frame_age=clock( )−frame_load_time;

frame_age_relative=thread_time_offset−frame_load_time_relative;

For any earlier frames in each stack, both the actual frame age and the relative frame age are computed by comparison with the frame above in the stack:

frame_age=above_frame→frame_load_time−frame_load_time;

frame_age_relative=above_frame→frame_load_time_relative−frame_load_time_relative;

The thread dump generation routine, while dumping the thread stack, obtains the global timer value and uses the value against each frame's load time to dump the total time spent as part of the stack trace.

The method "clock( )" used to retrieve the system time may be too expensive to use frequently. This is well understood by those skilled in the art, and easily worked around. For example, a low-resolution clock that is updated infrequently by a separate timer thread may be used and may result in a lower performance cost. The lack of resolution will not affect the utility of the results in determining a large discrepancy, which is the usual indicator of a significant anomaly.

An example of one embodiment of the present invention is depicted in FIGS. 1A-1G. FIGS. 1A-1G demonstrate a thread which has launched a number of methods and has tracked the load time and relative load time within each method frame. In FIG. 1A, a thread 100 launches a first frame 110, java.lang.Thread.run(Thread.java). As is shown in the thread 100, the Thread Time Offset is 1400 ms. Accordingly, because the frame load time for the frame 110 is 1400 ms, the Relative Frame Load Time for frame 110 is 0 ms.

Figure 1B:
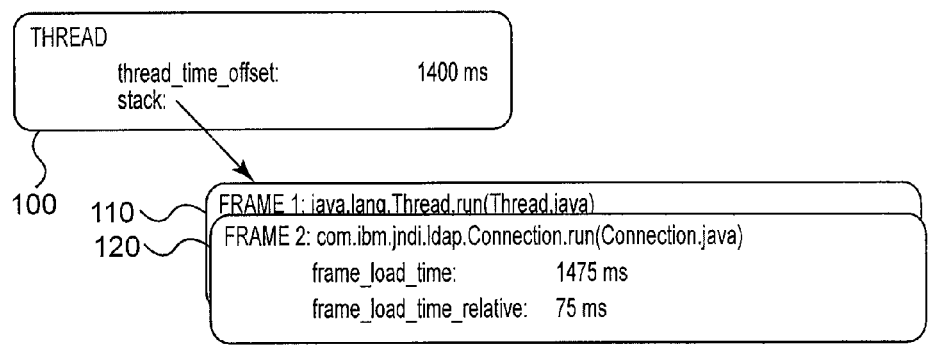
Figure 1C:
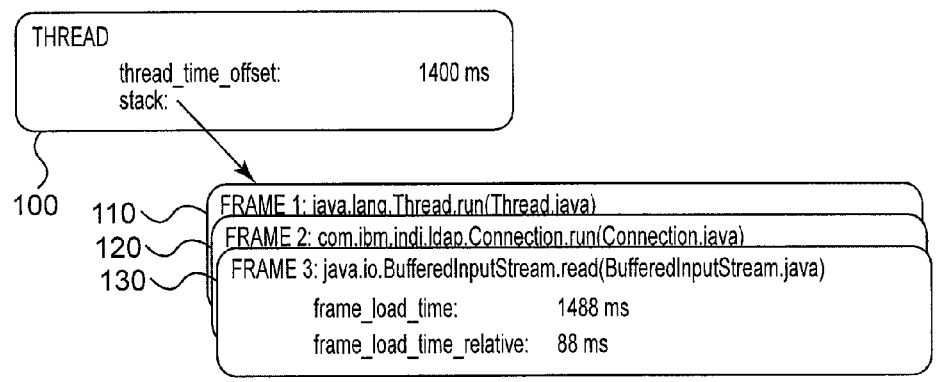
Figure 1D:
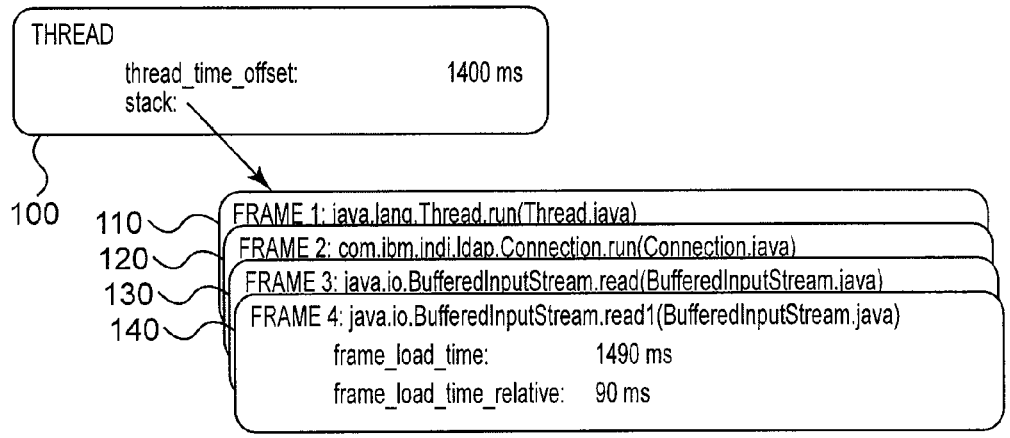
Figure 1E:
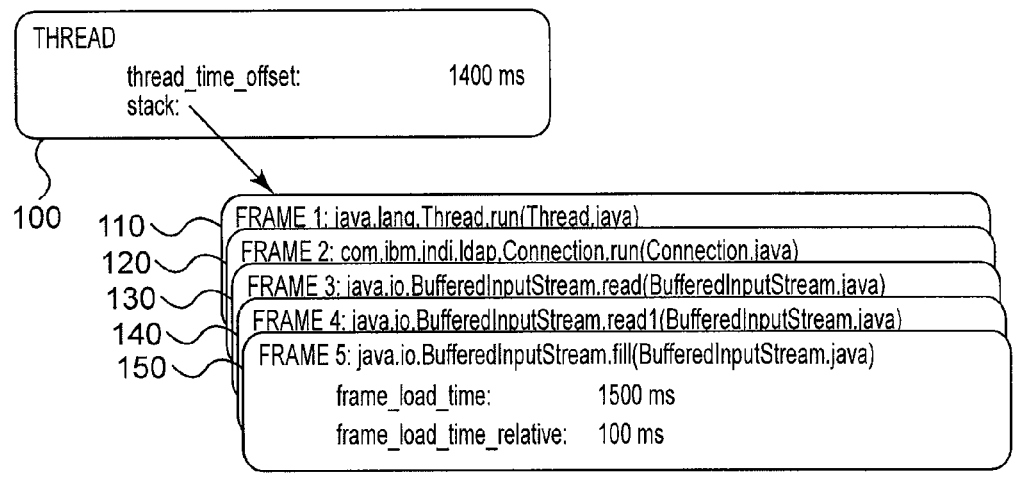

FIG. 1B shows the launch of Frame 2 120 for method com.ibm.jndi.ldap.Connection.run(Connection.java), with a Frame Load Time of 1475 ms. Based on the thread time offset stored in the thread 100, the Relative Frame Load Time for Frame 2 120 can be computed as 75 ms (1475 ms Frame Load Time−1400 ms Thread Time Offset). Similarly, FIG. 1C shows the launch of Frame 3 130 which has launched method java.io.BufferedInputStream.read(BufferedInputStream.java) with a Relative Frame Load Time of 88 ms; FIG. 1D shows the launch of Frame 4 140 for method java.io.BufferedInputStream.read1(BufferedInputStream.java) with a Relative Frame Load Time of 90 ms; and FIG. 1E shows the launch of Frame 5 150 for method java.io.BufferedInputStream.fill(BufferedInputStream.java) with a Relative Frame Load Time of 100 ms.

Figure 1F:
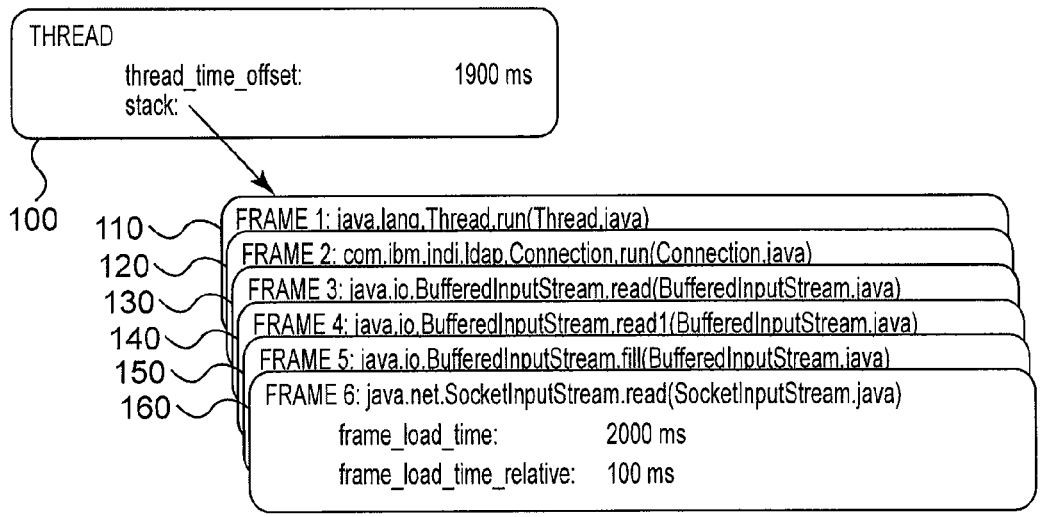
Figure 1G:
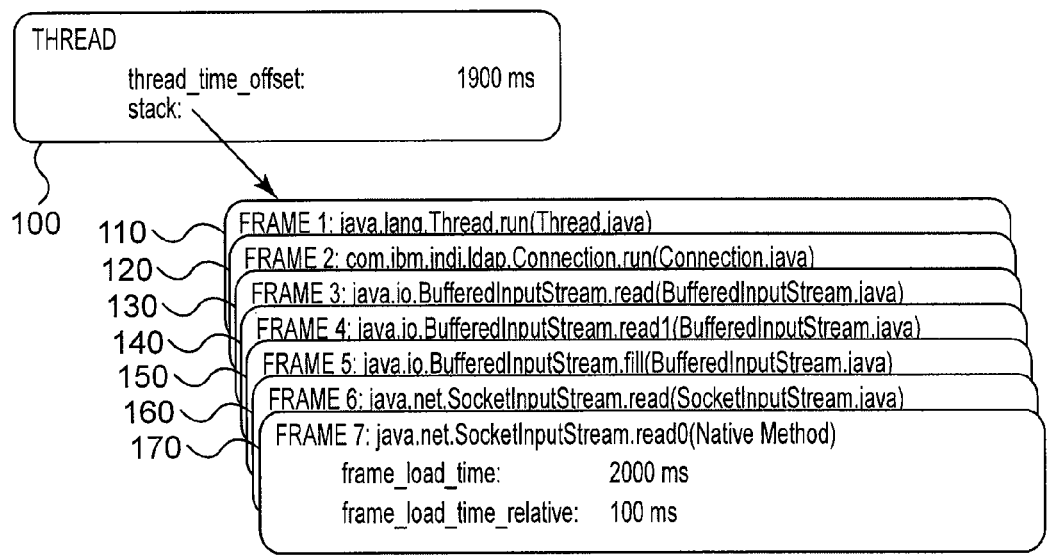

FIG. 1F shows Frame 6 launching java.net.SocketInputStream.read(SocketInputStream.java) with a load time of Relative Frame Load Time of 100 ms. This frame has been launched after the thread has slept for 500 ms (as is indicated by the increased Thread Time Offset from 1400 ms to 1500 ms). Finally, FIG. 1G shows Frame 7 launching java.net.SocketInputStream.read0(Native Method) with a Relative Frame Load Time of 100 ms.

An additional aspect of the present invention is that storing this timing information within the thread frame allows automatic cleanup when the thread exits. Thus, this embodiment of the present invention may be implemented with very small overhead (a fixed overhead based on the number of threads) with no additional memory management costs.

Based on the frames presented in FIGS. 1A-1G with a global timer value at the time of the dump to be 2500 ms, the dumped stack trace in the thread dump would be similar to the one presented in FIG. 2. Further, FIG. 2 depicts three ways a thread dump can change over time, without the call stack changing. Because the call stack does not change at all in any of the three cases, there is not enough information to diagnose what has happened between the thread dumps. This embodiment of the present invention allows extra data to be displayed along with the call stack that will aid in the diagnosis of the software hang or performance issue.

In FIG. 2, a thread dump 200 is shown as including frames 201-207, with Age and Relative Age values being calculated for each frame. As shown in thread dump 200, frame 203 provides a age of 500 ms, but a relative age of 0 ms. This comparison of age with relative age shows that the thread was suspended for 500 ms.

Next, the age and relative age of threads is shown for thread dump 210, with the values in 211-217 correlating to the frames shown in 201-207. This thread dump indicates a tight loop in the top frame over 60 seconds, as the age of frame 211 is the same as its relative age. Thus, because only the top frame has aged, this indicates that the java.net.SocketInputStream.read0 method has been running now for over 60 seconds and may be stalled.

Next, the age and relative age of threads is shown for thread dump 220, with the values in 221-227 correlating to the frames shown in 201-207. This thread dump is shown after a loop in the second frame 222 for over 60 seconds. Here, only the second frame 222 has aged, indicating a different long running method. In addition, frame 221 has only aged 100 ms, because a new instance of the SocketInputStream.read0( ) method has been placed on the frame stack.

Finally, the age and relative age of threads is shown for thread dump 230 with the values in 231-236 correlating to the frames shown in 201-206. This thread dump is shown after the thread was suspended for 59 seconds. Thus, the relative age of the top frame 231 has not increased very much as compared to its total age because the thread has been sleeping.

In FIG. 2, only the latter dumps shown in 210, 220, and 230 are actually required to diagnose the condition. The earlier dump shown in 200 is depicted to describe the context. Additionally, there are few performance concerns by providing the output for the frame age within thread dump and merely formatting it at that time.

Figure 3:
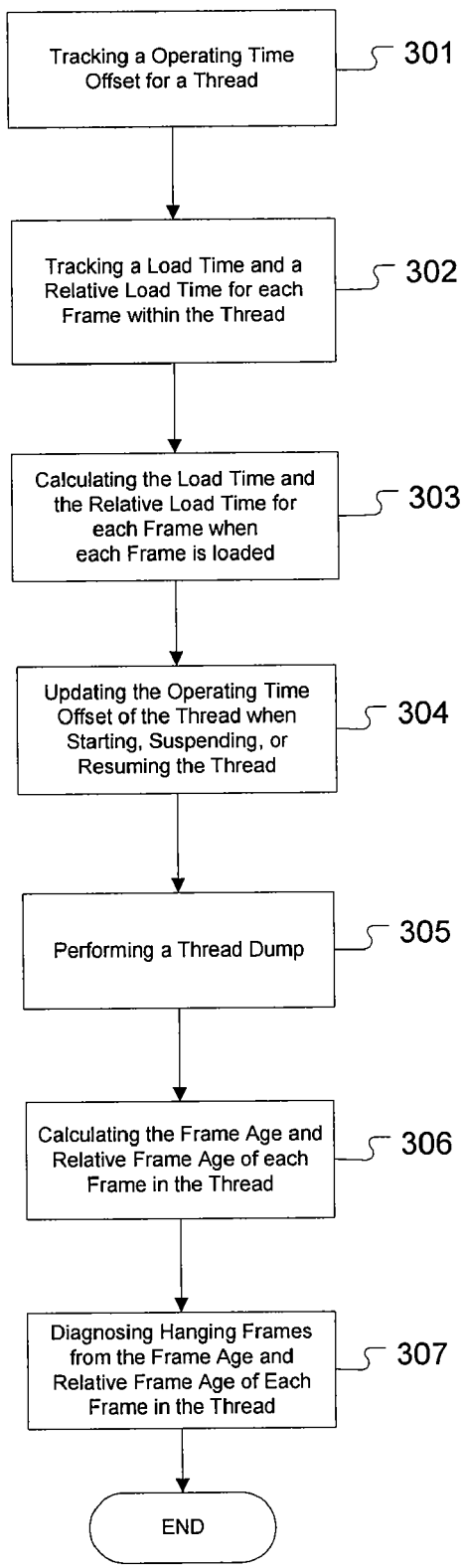
FIG. 3 illustrates an example operation of a method for performing effective diagnosis of software hangs in accordance with one embodiment of the present invention.

FIG. 3 depicts a example operation of a method for performing effective diagnosis of software hangs in thread frames in accordance with one embodiment of the present invention. As shown in step 301, the first value which is tracked is the operating time offset for a thread, with this operating time offset value stored within an area of memory of the thread. When the thread is active, this operating time offset value is a timestamp comprising an effective start time of the thread adjusted to the time that the thread has been actively operating. Restated, the effective start time is the time when the thread would have started, given its current age, if the thread had always been active. Thus, the operating time offset value produces an operating time which factors out any suspension of the thread. When the thread is inactive, the operating time offset comprises a cumulative time of thread operation.

As in step 302, two values are tracked for each frame of the thread within an area of memory of the frame. A load time for the frame is tracked which comprises a time stamp indicating when each frame is loaded. In addition, a relative load time for the frame is tracked which comprises the load time for each frame minus the operating time offset of the thread that is computed while the thread is active. Accordingly, when each frame is loaded as in 303, the load time for the frame and the relative load time for the frame are calculated. As in 304, the operating time offset of the thread is updated responsive to starting, suspending, or resuming operations with the thread.

When a thread dump is performed at a specified time as in 305, the amount of processing time spent in each thread frame can be determined. As in step 306, responsive to performing the thread dump, frame age and relative frame age values are calculated for each frame of the thread. The frame age indicates the amount of time that the frame has been running, whereas the relative frame age indicates the amount of time that the frame has actively performed operations. The frame age and the relative frame age values are derived from the time of the thread dump, the operating time offset of the thread, the load time of the frames within the thread (which may include factoring the load time of the frame above the frame on the stack), and the relative load time of the frames within the thread (which may include factoring the relative load time of the frame above the frame on the stack).

Finally, as in 307, the user can diagnose hanging frames of the thread operating within the software application based on the frame age and the relative frame age for each frame of the thread. For example, the frame age and relative frame age may be displayed to a user to alert the user to the hanging frame, or some automatic action may occur on the computer system based on the values.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing effective diagnosis of software hangs, comprising:

tracking an operating time offset of a thread within an area of memory of the thread, the thread operating within a software application on a computer system, and the operating time offset comprising a time value indicating an amount of time the thread has actively operated on the computer system;

tracking, for each frame of the thread, a load time for the frame within an area of memory of the frame, the load time comprising a time value indicating when the frame was loaded within the thread on the computer system;

tracking, for each frame of the thread, a relative load time for the frame within an area of memory of the frame, the relative load time comprising a time value adjusted for inactivity of the thread indicating when the frame was loaded within the thread on the computer system derived from the load time for the frame and the operating time offset of the thread;

setting, for each frame when loaded, the load time for the frame and the relative load time for the frame;

updating the operating time offset of the thread responsive to starting, suspending, or resuming operations with the thread;

performing a thread dump at a specified time;

calculating, for each frame of the thread responsive to performing the thread dump, a frame age and a relative frame age, the frame age indicating the amount of elapsed time since the frame started running and the relative frame age indicating the amount of time that the frame has actively performed operations, the frame age and the relative frame age derived from the time of the thread dump, the operating time offset of the thread, the load time of the frames within the thread, and the relative load time of the frames within the thread; and diagnosing hanging frames of the thread operating within the software application based on the frame age and the relative frame age of each frame of the thread.

\* \* \* \* \*